Dec. 6, 1966 C. G. SIMONS 3,289,633
BUCKET FOR MILKING APPARATUS
Filed June 24, 1965

INVENTOR.
CLIFFORD G. SIMONS
BY
Andrus & Starke
ATTORNEYS

United States Patent Office 3,289,633
Patented Dec. 6, 1966

3,289,633
BUCKET FOR MILKING APPARATUS
Clifford G. Simons, Delavan, Wis., assignor to Sta-Rite Products, Inc., Delavan, Wis., a corporation of Wisconsin
Filed June 24, 1965, Ser. No. 466,606
6 Claims. (Cl. 119—14.01)

This invention relates to a milking machine and more particularly to a compartmentalized bucket to be used with a milking machine.

The conventional milking machine includes four teat cups which are attached to the cow's teats and a hose connects each teat cup with a nipple on a bucket or claw. Milk is drawn through each of the teat cups and is either collected in the bucket or is conveyed through the bucket or claw to a pipeline, through which the milk is transferred to a bulk storage tank.

It is often desirable to check on the volume and quality of the milk and most dairymen keep production records for each cow which indicates the cow's capacity as well as the butterfact content or acid degree value. In making the production record, the volume and quality of the milk from each cow can be recorded, but there is no device for inspecting the volume and quality of the milk drawn from each quarter of the udder.

Similarly, it is often desirable to make a routine mastitis check on all the cows in the herd. Mastitis is an irritation or infammation of the mammary tissue which can be caused by mechanical abuse to the udder and teats and the entrance of pathological organisms in the udder. In making the mastitis check, the check is normally made on the milk drawn from each quarter and there is no device presently used in which the mastitis check can be made for each individual quarter of the udder after milking.

The present invention is directed to a bucket for use in a milking machine which enables the dairyman to check the quality and quantity of milk from each quarter of the udder. More specifically, the device includes a lid having four nipples, each of which is connected by a hose to one of the four teat cups. The lid encloses an opening in a bucket or milk receiving container and each nipple in the lid communicates with a separate chamber or compartment in the bucket. As milk is drawn through the teat cups, the milk from each teat is collected separately in one of the four compartments in the bucket.

At least a portion of the wall of the bucket is transparent and provided with graduations so that the milk can be seen and inspected as it is drawn into each of the compartments. The graduations provide an indication of the quantity of milk being drawn from each quarter.

With the bucket of the invention, the milk capacity of each quarter of the cow's udder can be readily determined. In addition, by segregating the milk from each quarter into the separate compartments in the bucket the dairyman can readily check on any injury to the cow and can determine immediately which quarter is injured. This provides an additional advantage in that if the milk from one quarter is unacceptable due to blood, mastitis, etc., the milk from the remaining quarters can be retained.

In addition to checking the capacity from each quarter, a check can be made on the quality, such as the butterfat content, and acid degree value of each quarter. By knowledge of the quality and quantity of milk drawn from each quarter of the udder, the dairyman can, by breeding, alter the capacity or quality of the milk to provide a herd having more desirable milk-producing characteristics.

Other objects and advantages will appear in the course of the following description.

The drawings illustrate the best mode presently contemplated of carrying out the invention.

The drawings illustrate a milking machine, including a lid 1 having four milk-receiving cups 2 mounted therein. A slanted nipple extends outwardly from each cup and is connected by a hose 3 to a teat cup 4 which is adapted to be applied to a teat of the cow.

Figure 1:
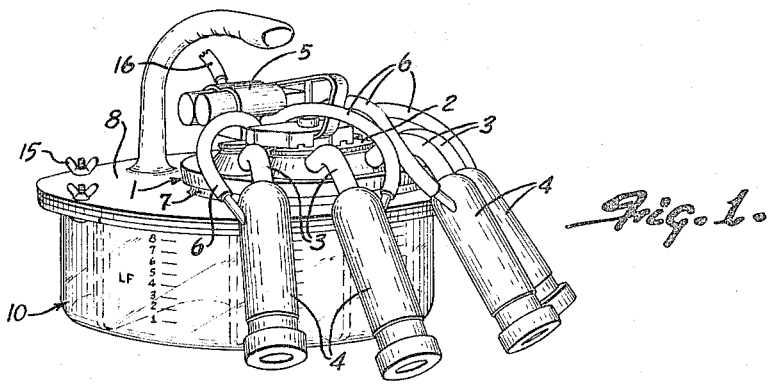
FIG. 1 is a perspective view of a milking machine, including the bucket of the invention.

A standard pulsator unit 5 is mounted on the upper surface of the lid 1 and the pulsator is connected by hoses 6 to the teat cups 4 and serve to alternately apply a vacuum and atmospheric pressure to the space between the outer shell and the rubber inflation of the teat cup in a conventional manner so as to provide the proper milking action to the teats. The lid 1, as shown in FIG. 1, is similar to that described in U.S. Patent 3,192,900 and provides a release mechanism which automatically releases the teat cup 4 from the cow's teat at the completion of the milking operation.

The lid 1 is mounted on a flange 7 which extends upwardly from a cover 8 and the lid is sealed to the flange by an annular seal or gasket 9. As shown in FIG. 1, the cover 8 is generally flat and encloses the upper end of a bucket 10. The upper edge of the bucket is provided with an outwardly extending flange 11 and a gasket 12 serves to provide a seal between the peripheral edge of the cover 8 and the flange 11 of bucket 10. A reinforcing ring 13 is bonded to the lower surface of flange 11 to strengthen the flange.

The cover 8 is secured to the bucket 10 by a series of bolts 14 which extend through aligned openings in the ring 13, flange 11 and cover 8 and are tightened down by means of wing nuts 15.

To apply vacuum to the interior of the bucket 10, a hose 16 is connected between a source of vacuum, such as a vacuum line or a vacuum pump, and a nipple on pulsator 5. Hose 16 communicates with a passage in the pulsator which in turn communicates with the interior of bucket 10 so that vacuum is continuously drawn in the bucket.

Figure 2:
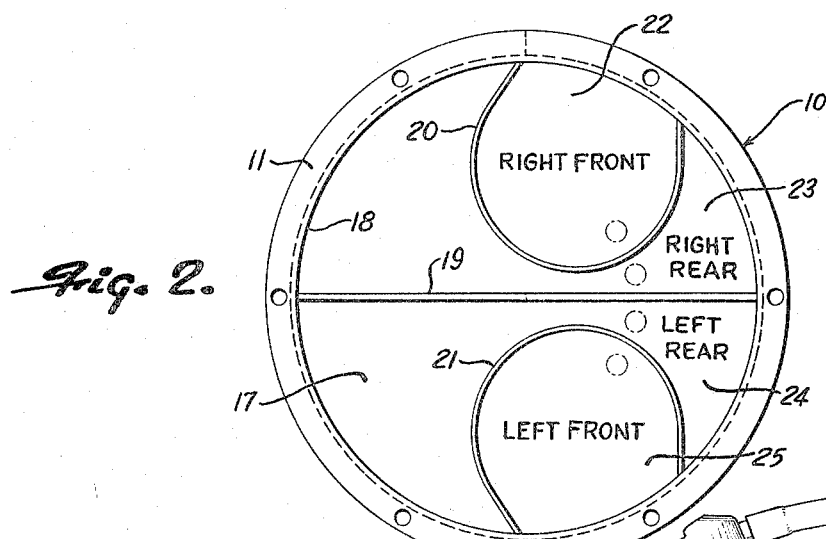
FIG. 2 is a top plan view of the bucket with the positions of the milk outlet openings in the lid being indicated by phantom lines.
Figure 3:
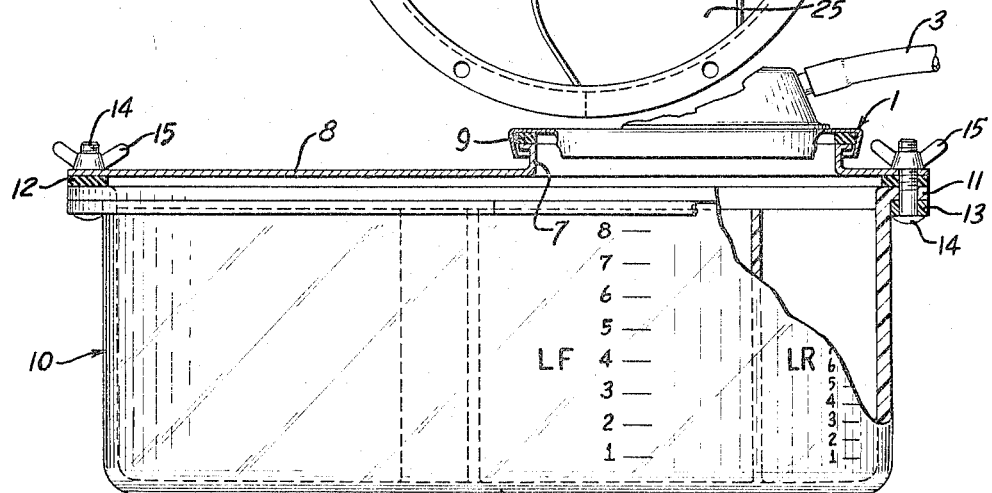
FIG. 3 is a side elevation section showing the attachment of the lid to the bucket.

The bucket 10 is provided with a generally flat bottom wall 17 and a cylindrical side wall 18. A central divider wall 19 extends upwardly from the bottom wall 17 and is located diametrically across the bucket. In addition to the central wall 19, a pair of generally curved walls 20 and 21 are attached to the side wall 18 on either side of the central divider wall 19. The central wall 19, along with the walls 20 and 21 and the side wall 18, define four separate chambers or compartments 22, 23, 24 and 25. Each of the compartments is located directly beneath the milk outlet opening in the bottom of a cup 2 so that the milk flowing from the cups will fall into the individual compartments 22 to 25. This is best shown in FIG. 2, in which the milk outlet openings in cups 2 are indicated by phantom lines. As the rear quarters of the udder generally have a greater capacity than the front quarters, the chambers 23 and 24 which are connected to the rear quarters, have a greater volumetric capacity than the compartments 22 and 25 which are connected to the front quarters.

The upper edges of walls 19, 20 and 21 are spaced beneath the cover 8 so that a vacuum can be drawn through each of the cups 2 to the respective teat cups 4.

In order to readily measure the capacity of each quarter, the bucket 10 is preferably formed of a transparent material, such as plastic, glass or the like, and graduations are applied to the side wall 18 in alignment with each of the compartments 22–25. The graduations preferably are made in half pound increments and identify the quarter, so that the dairyman can readily see the capacity of each individual quarter.

Instead of the entire bucket 10, as well as the walls 19, 20 and 21 being formed of a transparent material, the bucket can be formed of an opaque material, such as metal or the like, and in this case it would be provided with windows or apertures containing the graduations so that the dairyman could observe the quantity of milk for each quarter through the various windows.

The bucket of the invention can be used for each milking operation by the dairyman, or it can be employed at various times when the dairyman desires to check either the quality or quantity of each quarter of the udder of each particular cow.

Not only does the device give an indication of the precise volume of each quarter, but enables the dairyman to readily check the quality, such as the butterfat content and acid degree value for each quarter. The device has an additional advantage in that the dairyman can readily observe if an injury has occurred to any udder quarter and if the milk from that particular quarter contains blood or the like, that quantity of milk can be discarded and the remainder of the milk from the other quarters can be retained. Similarly, if one of the quarters has mastitis the milk from that quarter can be discarded and the milk from the other quarters can be retained.

While the above description is directed to the use of an automatic-type lid having a series of milk-receiving cups 2, it is contemplated that the bucket of the invention can be used with a nonautomatic type lid in which milk inlet nipples are secured within openings in the lid and the lower end or outlet of each nipple is positioned directly above one of the compartments 21 to 25. Moreover, instead of the four milk-receiving compartments being located within a single bucket, it is contemplated that four individual milk-receiving containers can be employed each of which is separately connected to a teat cup.

Various modes of carrying out the invention are contemplated as being within the scope of the following claims particularly pointing out and distinctly claiming the subject matter which is regarded as the invention.

I claim:

1. A milking apparatus, comprising a bucket having an opening in the upper end and having a bottom wall and a side wall providing a top edge, a lid to enclose the opening in the bucket and including four milk inlet openings with each milk inlet opening connected to a teat cup, wall means extending up from the bottom of the bucket to the top edge thereof and dividing the bucket into four individual chambers with each chamber communicating with one of the milk inlet openings in the lid whereby milk from each individual teat cup is collected in a separate chamber, and means for connecting each of the chambers to a source of vacuum.

2. In a milking apparatus, a bucket having an opening in the upper end and having a bottom wall and a side wall, a first central wall extending diametrically across the bucket, a second wall attached to the side wall on one side of the first central wall and defining a first compartment with the side wall and defining a second compartment with the first central wall and with the side wall, a third wall attached to the side wall on the opposite side of the first central wall from said second wall and defining a third compartment with the side wall and defining a fourth compartment with the first central wall and the side wall, and a lid enclosing the opening in the bucket and having a series of milk inlet openings with each milk inlet opening connected to a teat cup, each of said milk inlet openings being located in vertical alignment with one of said compartments whereby the milk from each individual teat cup is separately collected in the compartments.

3. A milking apparatus, comprising a bucket having an opening in the upper end and having a bottom wall and a side wall, a lid to enclose the opening in the bucket and including four milk inlet openings with each milk inlet opening connected to a teat cup, a series of generally vertical walls extending upwardly from the bottom of the bucket and terminating in vertical spaced relation from a horizontal plane extending across the top edge of the side wall of the bucket, said vertical walls dividing the interior of the bucket into four individual compartments with each compartment being in vertical alignment with one of the milk inlet openings in the lid whereby milk from each individual teat cup is collected in a separate compartment, and means for connecting the interior of the bucket to a source of vacuum.

4. Apparatus of claim 3 in which two of the compartments are disposed to receive milk from the rear quarters of the udder and have a larger volume than the other two compartments which are disposed to receive milk from the front quarters.

5. A milking apparatus, comprising a bucket having an opening in the upper end and having a bottom wall and a side wall, a lid to enclose the opening in the bucket and including four milk inlet openings with each milk inlet opening connected to a teat cup, a series of generally vertical walls extending upwardly from the bottom of the bucket and terminating in vertical spaced relation from a horizontal plane extending across the top edge of the side wall of the bucket, said vertical walls dividing the interior of the bucket into four individual compartments with each compartment being in vertical alignment with one of the milk inlet openings in the lid whereby milk from each individual teat cup is collected in a separate compartment, each compartment being defined at least in part by the side wall of the bucket and at least a portion of the side wall defining each compartment being transparent so that the milk contained within each compartment is visible, and means for connecting the interior of the bucket to a source of vacuum.

6. A milking apparatus, comprising a bucket having an opening in the upper end and having a bottom wall and a side wall, a lid to enclose the opening in the bucket and including four inlet openings with each inlet opening connected to a teat cup, wall means extending up from the bottom of the bucket to adjacent the top edge thereof and dividing the bucket into four individual chambers with each chamber communicating with one of the milk inlet openings in the lid whereby milk from each individual teat cup is collected in a separate chamber, at least a portion of said side wall being transparent so that the milk contained within each chamber is visible, means for connecting each of the chambers to a source of vacuum, and volumetric indicating means associated with each chamber for indicating the volume of milk in each chamber.

References Cited by the Examiner

UNITED STATES PATENTS

| | | | |
|---|---|---|---|
| 1,519,827 | 12/1924 | Fuge | 119—14.17 |
| 2,445,904 | 7/1948 | Bloemers | 119—14.08 |
| 2,703,067 | 3/1955 | Carson | 119—14.01 |

SAMUEL KOREN, *Primary Examiner.*

HUGH R. CHAMBLEE, *Examiner.*